United States Patent Office 3,093,645
Patented June 11, 1963

3,093,645
N-OXIDES OF AMINO-s-TRIAZINES AND PROCESS FOR PREPARING THEM
John T. Shaw, Middlesex, N.J., assignor to American Cyanamid Company, New York, N.Y., a corporation of Maine
No Drawing. Filed May 9, 1961, Ser. No. 108,722
9 Claims. (Cl. 260—249.9)

This invention relates to new mono-N-oxides of amino-s-triazines and to a process for their preparation. More partciularly, this invention relates to 2-NHR-s-triazine 3-oxides, and to the oxidation procedure for their preparation, wherein R is as hereinafter defined.

The reaction of potassium dicyanoguanidine with hydroxyamine is known from U.S. Patent 2,729,640 to give the mono-N-oxide of melamine. Until the present invention, however, mono-N-oxides of non-melamine-s-triazines have not been known.

It is an object of the present invention to provide a procedure whereby non-melamine-s-triazines, as hereinafter described, can be converted to mono-N-oxide derivatives. It is a further object to provide a new class of useful mono-N-oxides of s-triazines as hereinafter described. Other objects will become apparent to those skilled in the art.

The compounds of this invention have the Formula I:

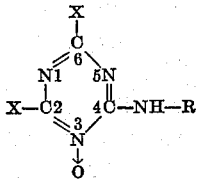

wherein one X is hydrogen, alkyl, halogenated alkyl (e.g., per-halo alkyl such as trifluoromethyl, trichloromethyl, pentadecafluoro-n-heptyl, and omega-hydro-perfluoroalkyl such as hexadecafluoro-omega-hydro-n-octyl), aryl (especially monocyclic 6-membered carbocyclic aryl), aralkyl (especially monocyclic 6-membered carbocyclic aryl-lower alkyl, e.g. benzyl and phenethyl), pyridyl, furyl, hydroxy, alkoxy (especially lower alkoxy), aryloxy (especially monocyclic carbocyclic 6-membered aryloxy, $(CH_2)_nA$ or

the other X is hydrogen, aralkyl (especially monocyclic carbocyclic 6-membered aryl-lower alkyl), alkyl (especially alkyl of up to eighteen carbons), aryl (especially monocyclic, carbocyclic 6-membered aryl), or

R, $R_1$ and $R_2$ are individually either hydrogen, alkyl (especially lower alkyl), aralkyl (especially monocyclic, carbocyclic 6-membered aryl-lower alkyl) or aryl (especially monocyclic carbocyclic 6-membered aryl); $n$ is a positive integer less than 19, and A is the radical

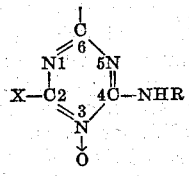

wherein R and X are as hereinbefore defined and both correspond respectively to the substituents of the other triazine moiety. The radical R and only one X may be further substituted by such electronegative substituents as halogen, alkoxy, hydroxy, cyano or nitro.

The compounds of Formula I are prepared by the process of this invention which comprises treating a solution or suspension of a compound of the formula

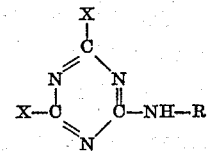

wherein R and X are as hereinbfore defined, with an organic peracid at a temperature between about 15° and about 85° C.

The organic peracids which may be used in this invention include such acids as peracetic acid, perphthalic acid, perbenzoic acid and trifluoroperacetic acid.

Suitable for use as a reaction medium is a polar organic solvent such as glacial acetic acid, trifluoroacetic acid or chloroform.

While the temperature of the reaction may vary between the limits above set forth, the preferred temperature in most cases lies between about 30° and about 50° C.

The ratio of peracid to triazine is not critical. A theoretical amount may be used, but it is preferred to use an excess of peracid, e.g., a 50% excess, or even more.

The reaction is conducted by adding the peracid to a mixture or solution of the triazine on the reaction medium, and then heating the mixture within the prescribed range until reaction is substantially completed. The product can be separated from the reaction mixture by filtration; or fractional crystallization and further purified by washing and recrystallization, as desired.

The amino-s-triazines which may be reacted with the peracids to form N-oxides may be divided into two classes of s-triazine compounds. These include the 2-amino-s-triazines and the 2,4-diamino-s-triazines. These compounds contain at least one, and no more than two, free amino groups or mono-substituted amino groups.

The first class of compounds includes such compounds as 2-amino-4,6-dimethyl-s-triazine, 2-amino-4-methyl-6-trichloromethyl-s-triazine, 2-amino-4-phenyl-6-trichloromethyl-s-triazine, 2-amino-4,6-diphenyl-s-triazine, 2-amino-4-hydroxy-6-methyl-s-triazine, 2-amino-4-hydroxy-6-nonyl-s-triazine, 2-amino-4-hydroxy-6-phenyl-s-triazine, and 2-amino-4-hydroxy-6-(p-chlorophenyl)-s-triazine.

The second class of compounds, namely the 2,4-diamino-s-triazines, includes the guanamines, such as 2,4-diamino-6-methyl-s-triazine,
2,4-diamino-6-trifluoromethyl-s-triazine,
2,4-diamino-6-trichloromethyl-s-triazine,
2,4-diamino-6-isopropyl-s-triazine,
2,4-diamino-6-heptadecyl-s-triazine,
2,4-diamino-s-triazine,
2,4-diamino-6-pentadecafluoroheptyl-s-triazine,
2,4-diamino-6-undecyl-s-triazine,
2,4-diamino-6-heptadecyl-s-triazine,
2,4-diamino-6-beta-ethoxyethyl-s-triazine,
2,4-diamino-6-beta-cyanoethyl-s-triazine,
2,4-diamino-6-alpha-hydroxyethyl-s-triazine,
2,4-diamino-6-phenyl-s-triazine,
2,4-diamino-6-p-tolyl-s-triazine,
2,4-diamino-6-benzyl-s-triazine,
2,4-diamino-6-alpha-naphthyl-s-triazine,
2,4-diamino-6-o-hydroxyphenyl-s-triazine,
2,4-diamino-6-o-cyanophenyl-s-triazine,
2,4-diamino-6-p-nitrophenyl-s-triazine,
2,4-diamino-p-methoxyphenyl-s-triazine, 2,4-diamino-6-(2-furyl)-s-triazine,
2,4-diamino-6-(3-pyridyl)-s-triazine,
2,4-diamino-6-(2-pyridyl)-s-triazine,
2,4-diamino-6-(2-thienyl)-s-triazine,
2-amino-4-methylamino-6-trichloromethyl-s-triazine,
2-amino-4-anilino-6-methyl-s-triazine,
2-amino-4-cyclohexylamino-s-triazine,
2-amino-4-anilino-s-triazine,
2-amino-4-anilino-4-phenyl-s-triazine,
2-amino-4-anilino-6-heptadecyl-s-triazine,
2-amino-4-acetamido-6-methyl-s-triazine,
2,4-bis(methylamino)-6-methyl-s-triazine and
2-amino-4-(2-pyridylamino)-s-triazine; and the guanides, such as
2,4-diamino-6-hydroxy-s-triazine,
2,4-diamino-6-methoxy-s-triazine,
2,4-diamino-6-hexyloxy-s-triazine,
2,4-diamino-6-phenoxy-s-triazine,
2,4-diamino-6-(p-nitrophenoxy)-s-triazine, and
2-amino-4-methylamino-6-n-butoxy-s-triazine. Also to be included are the
bis-2,4-diamino-s-triazines, such as
1,2-ethylene-bis[2-(4,6-diamino-s-triazine)],
1,4-tetramethylene-bis[2-(4,6-diamino-s-triazine)],
1,8-octamethylene-bis[2-(4,6-diamino-s-triazine)],
1,4-phenylene-bis[2-(4,6-diamino-s-triazine)] and
1,4-tetramethylene-bis[2-(4-amino-6-anilino-s-triazine)].

The products of this invention are useful as metal chelating agents and as textile finishing agents.

As chelating agents, the compounds are capable of combining with metallic ions, thereby sequestering the ions from a solution containing them. By proper choice of the N-oxide, oil soluble metal complexes, particularly iron complexes, are made possible.

As textile finishing agents, the compounds of this invention are useful as water- and oil-repellents. Particularly useful in this capacity are the N-oxides of 2,4-diamino-6-fluoroalkyl-s-triazines such as 2,6-diamino-4-pentadecafluoroheptyl-s-triazine-1-oxide and 2,6-diamino-4-hexadecafluoro-omega-hydro-n-octyl-s-triazine 1-oxide.

When methylolated, the products of this invention are reactive with cellulosic textile materials. With two or more methylol groups present, durable crosslinking agents are obtained which impart crease resistance in addition to other properties, to cellulosic textile materials.

The following examples are presented to more fully illustrate the present invention. Parts and percentages are on a weight basis.

EXAMPLE 1

2,6-Diamino-s-Triazine 1-Oxide

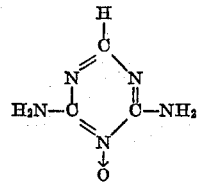

To a solution of 11.1 parts (0.1 mole) of 2,4-diamino-s-triazine in 600 parts of glacial acetic acid at a temperature of about 36° C., there was added 28.5 parts of 40% peracetic acid (0.15 mole) over a 20-minute period. The reaction mixture was stirred at about 39° C. for 24 hours. The resulting precipitate was filtered from the reaction mixture, washed with ether and dried. The product was recrystallized by dissolving in hot water and adding sufficient ammonium hydroxide to give a pH of 8. The purified product had a melting point of about 310° C. and gave a deep red color with ferric chloride solution.

Analysis.—Calculated for $C_3H_5N_5O$: C, 28.3; H, 3.93; N, 55.2. Found: C, 28.2; H, 3.99; N, 55.1.

EXAMPLE 2

2,6-Diamino-4-Methyl-s-Triazine 1-Oxide

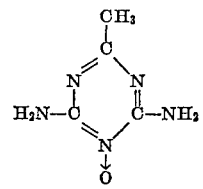

To a stirred suspension of 125.1 parts (1.0 mole) of 2,4-diamino-6-methyl-s-triazine in 750 parts of glacial acetic acid, there was added over a period of 5 hours, 271 parts of 42% (1.5 moles) peracetic acid at a temperature of about 40° C. When about ⅔ of the peracetic acid has been added, a clear solution resulted, but by the end of the addition a precipitate had appeared. The reaction mixture was stirred for 19 hours at a temperature of about 43° C. The precipitate, after separation by filtration, was washed with 50% aqueous acetic acid, with acetone and then dried. The product, after purification by crystallization from 50% aqueous acetic acid, had a melting point above about 330° C.

Analysis.—Calculated for $C_4H_7N_5O$: C, 34.1; H, 4.98; N, 49.7. Found: C, 34.1; H, 5.02; N, 49.4.

EXAMPLE 3

2,6-Bis(Methylamino)-4-Methyl-s-Triazine 1-Oxide

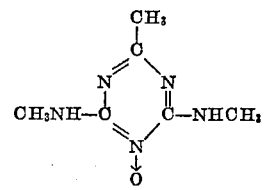

To a stirred solution of 11.0 parts (0.0718 mole) of 2,4-bis(methylamino)-6-methyl-s-triazine in 70 parts of glacial acetic acid there was added about 29° C., in a dropwise fashion, 20.5 parts of 40% peracetic acid (0.108 mole). The solution was stirred at about 43° for 24 hours. This solution was then evaporated until a precipitate appeared. The precipitate, which was starting material, was filtered from the reaction mixture. The filtrate was then evaporated to dryness, and the residue was stirred with ether, filtered and dried. The product, after crystallization from hot water and then from chlorobenzene, melted at about 204–207° C. and gave a deep red color with aqueous ferric chloride solution.

Analysis.—Calculated for $C_6H_{11}N_5O$: C, 42.6; H, 6.50; N, 41.4. Found: C, 42.8; H, 6.54; N, 41.5.

EXAMPLE 4

2-Amino-6-Anilino-4-Methyl-s-Triazine 1-Oxide

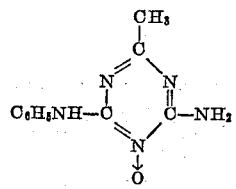

To a stirred suspension of 20.1 parts (0.1 mole) of 2-amino-4-anilino-6-methyl-s-triazine in 150 parts of glacial acetic acid, there was added in a dropwise fashion, 28.5 parts of 40% peracetic acid (0.15 mole) at a temperature of about 31° C. The reaction mixture was heated at about 41° C. for 22 hours. To the resulting solution there was added about 400 parts of ether, and a small amount of the starting material was filtered off.

After partial evaporation of the filtrate and removal of the precipitate by filtration, the filtrate was evaporated to dryness. The residue was recrystallized from hot water, and then from ethanol giving a product melting at about 258° C. with decomposition.

*Analysis.*—Calculated for $C_{10}H_{11}N_5O$: C, 55.3; H, 5.07; N, 32.3. Found: C, 55.2; H, 4.87; N, 32.3.

EXAMPLE 5

*2,6-Diamino-4-Trifluoromethyl-s-Triazine 1-Oxide*

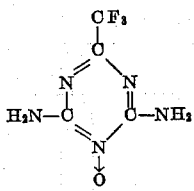

To a stirred suspension of 8.0 parts (0.0446 mole) of 2,4-diamino-6-trifluoromethyl-s-triazine in 50 parts of glacial acetic acid at 30° C., there was added 12.1 parts of 41% peracetic acid (0.0661 mole). The reaction mixture was stirred at about 43° C. for 29 hours, whereupon the precipitate was separated by filtration. The product melted at about 330° C. with decomposition, and gave a red color with aqueous ferric chloride solution.

*Analysis.*—Calculated for $C_4H_4F_3N_5O$: C, 24.6; H, 2.05; N, 35.9. Found: C, 24.6; H, 2.15; N, 36.1.

EXAMPLE 6

*2,6-Diamino-4-Trichloromethyl-s-Triazine 1-Oxide*

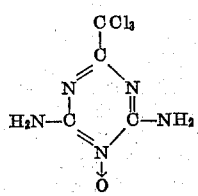

To a solution of 11.4 parts (0.05 mole) of 2,4-diamino-6-trichloromethyl-s-triazine in 50 parts of glacial acetic acid, there was added in a dropwise fashion over 20 minutes, 12.4 parts of 43% peracetic acid (0.07 mole) while keeping the temperature at about 42° C. The reaction mixture was then stirred at about 45° C. for 18 hours. The product, after separation by filtration, melted above about 330° C.

*Analysis.*—Calculated for $C_4H_4Cl_3N_5O$: C, 19.7; H, 1.64; N, 28.6. Found: C, 19.8; H, 1.85; N, 28.8.

EXAMPLE 7

*2,6-Diamino-4-Isopropyl-s-Triazine 1-Oxide*

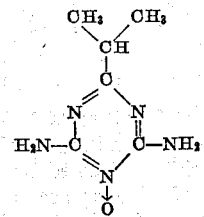

To a solution of 12 parts of 2,4-diamino-6-isopropyl-s-triazine (0.0782 mole) in 70 parts of glacial acetic acid, there was added 22.2 parts of 40% peracetic acid (0.117 mole) over a 20-minute period while keeping the temperature at about 39° C. After heating for 24 hours at about 40° C., the solution was evaporated. The residue was stirred with 25 parts of water and filtered. The precipitate was recrystallized from dilute acetic acid. The product melted at about 317° C. with decomposition and gave a red color with aqueous ferric chloride solution.

*Analysis.*—Calculated for $C_6H_{11}N_5O$: C, 42.6; H, 6.54; N, 41.4. Found: C, 42.5; H, 6.60; N, 41.7.

EXAMPLE 8

*2,6-Diamino-4-(Pentadecafluoro-n-Heptyl)-s-Triazine 1-Oxide*

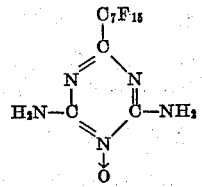

To a stirred solution of 20.0 parts (0.0417 mole) of 2,4 - diamino - 6 - (pentadecafluoro - n - heptyl) - s - triazine in 180 parts of glacial acetic acid, there was added over a 20-minute period, 11.1 parts of 40% peracetic acid (0.0626 mole) while maintaining a temperature at about 39° C. The reaction mixture was stirred for 24 hours at about 40° C. The precipitate which formed after cooling to room temperature and adding 50 parts of water was separated by filtration, washed several times with water and dried. The product, after crystallization from acetone, melted at about 188–191° C. and gave a deep red color with a methanol solution of ferric chloride.

*Analysis.*—Calculated for $C_{10}H_4N_5O$: C, 24.2; H, 0.807; N, 14.1. Found: C, 24.4; H, 0.73; N, 14.4.

The 2,4 - diamino - 6 - (pentadecafluoro - n - heptyl)-s-triazine may be prepared by the method of J. T. Shaw and F. S. Gross, J. Org. Chem., 24, 1809 (1959).

EXAMPLE 9

*2,6-Diamino-4-n-Undecyl-s-Triazine 1-Oxide*

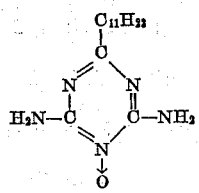

To a stirred solution of 26.5 parts (0.1 mole) of 2,4-diamino-6-n-undecyl-s-triazine in 150 parts of glacial acetic acid, there was added slowly 28.5 parts of 40% peracetic acid (0.15 mole) at a temperature of about 29° C. After stirring for 24 hours at about 43° C., the reaction mixture was cooled to 25° C. and 250 parts of water were added. The precipitate was separated by filtration and washed with water. The dried product, after crystallization from methanol, melted at about 244–246° C. with decomposition and gave an orange-red precipitate with ferric chloride on warming in aqueous solution.

*Analysis.*—Calculated for $C_{14}H_{27}N_5O$: C, 59.7; H, 9.66; N, 24.9. Found: C, 59.7; H, 9.08; N, 25.2.

EXAMPLE 10

*2,6-Diamino-4-n-Heptadecyl-s-Triazine 1-Oxide*

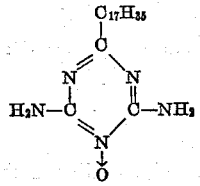

To a stirred solution of 34.9 parts (0.1 mole) 2,4-diamino-6-n-heptadecyl-s-triazine in 230 parts of glacial acetic acid, there was added dropwise over a few minutes, 28.5 parts of 40% peracetic acid (0.15 mole) while maintaining the temperature at about 41° C. After stirring the reaction mixture for 24 hours at 41° C., the precipitate was separated by filtration, washed with water and dried. The product, after crystallization from glacial acetic acid, melted at about 234–235° C. with decomposition and gave a solid precipitate with aqueous ferric chloride.

*Analysis.*—Calculated for $C_{20}H_{39}N_5O$: C, 65.6; H, 10.18; N, 19.2. Found: C, 65.6; H, 11.1; N, 19.0.

EXAMPLE 11

*2,6-Diamino-4-Phenyl-s-Triazine 1-Oxide*

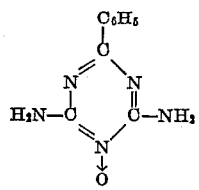

To a stirred suspension of 37.4 parts (0.2 mole) of 2,4-diamino-6-phenyl-s-triazine in 228 parts of glacial acetic acid, there was added 53 parts of 43% peracetic acid (0.3 mole) over a 15-minute period while keeping the temperature at about 42° C. After stirring the reaction mixture at about 43° C. for 24 hours, unreacted starting material was removed by filtration, and the filtrate was evaporated to a thick slurry. The product, after separation by filtration and crystallization from water, melted at about 232–234° C., and gave a deep red color with aqueous ferric chloride solution.

*Analysis.*—Calculated for $C_9H_9N_5O$: C, 53.3; H, 4.44; N, 34.5. Found: C, 53.4; H, 5.05; N, 34.6.

EXAMPLE 12

*2,6-Diamino-4-Benzyl-s-Triazine 1-Oxide*

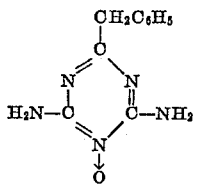

This product was prepared by the process described in Example 11 with the substitution of an equivalent amount of 2,4-diamino-6-benzyl-s-triazine for the 2,4-diamino-6-phenyl-s-triazine.

EXAMPLE 13

*2,6-Diamino-4-(3-Pyridyl)-s-Triazine 1-Oxide*

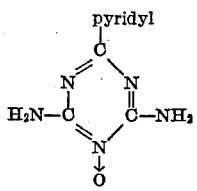

In a process otherwise similar to that of Example 11, 6.0 parts (0.032 mole) of 2,4-diamino-6-(3-pyridyl)-s-triazine was reacted with 18.3 parts (0.096 mole) of 40% peracetic acid. The product obtained melted about 335° C. dec. and gave a red color with ferric chloride.

EXAMPLE 14

The amino-s-triazine N-oxides shown in the following table can be prepared from the corresponding s-triazines by the procedures described in the foregoing examples.

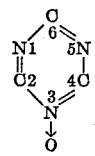

| 2-position | 4-position | 6-position |
|---|---|---|
| OH | $NH_2$ | $NH_2$ |
| $OCH_3$ | $NH_2$ | $NH_2$ |
| $OC_6H_5$ | $NH_2$ | $NH_2$ |
| $CH_2CH_2CN$ | $NH_2$ | $NH_2$ |
| $CH_2Cl$ | $NH_2$ | $NH_2$ |
| $CH_2OC_2H_5$ | $NH_2$ | $NH_2$ |
| H | $NH_2$ | $NHC_6H_5$ |
| $C_6H_4NO_{2-p}$ | $NH_2$ | $NH_2$ |
| $C_6H_4Cl-p$ | $NH_2$ | $NH_2$ |
| $C_6H_4OH-o$ | $NH_2$ | $NH_2$ |
| $C_4H_3O$(alpha-furyl) | $NH_2$ | $NH_2$ |

EXAMPLE 15

*2-Amino-6-Methyl-4-Trichloromethyl-s-Triazine-1-Oxide*

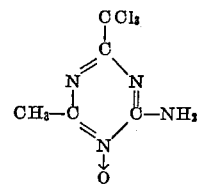

To a stirred solution of 10.0 parts (0.44 mole) of 2-amino-4-methyl-6-trichloromethyl-s-triazine in 60 parts of glacial acetic acid at about 24° C., there was added over a 10-minute period, 12.5 parts of 40% peracetic acid (0.066 mole). After the reaction mixture had been stirred at 40° C. for 24 hours, the product was isolated by evaporating the solution to a residual oil which was stirred with 80 parts of cold water and cooled in an ice bath until crystallization took place. The product, after crystallization from methanol, melted at about 187–189° C., and gave a deep red color with aqueous ferric chloride solution.

*Analysis.*—Calculated for $C_5H_5Cl_3N_4O$: C, 24.7; H, 2.06; N, 23.1. Found: C, 24.8; H, 2.29; N, 23.3.

EXAMPLE 16

*1,4-Tetramethylenebis[2-(4,6-Diamino-s-Triazine 5-Oxide)]*

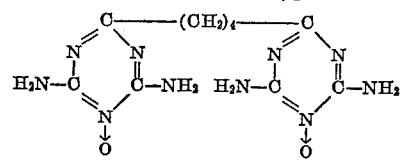

A stirred solution of 13.8 parts (0.05 mole) of 1,4-tetramethylene-bis[2-(4,6-diamino-s-triazine)] in 700 parts of glacial acetic acid was treated by the dropwise addition of 21.6 parts of 40% peracetic acid (0.114 mole) at about 37° C. over a 40-minute period. After stirring for 24 hours at about 39° C., and evaporating the solution until a thin slurry was obtained, a precipitate consisting of starting material was separated by filtration. The filtrate was evaporated and the residue was stirred with acetone, filtered and dried. The product after crystallization from hot water, melted at about 255–257° C. with decomposition and gave a deep red color with aqueous ferric chloride solution.

*Analysis.*—Calculated for $C_{10}H_{16}N_{10}O_2$: C, 38.9; H, 5.19; N, 45.4. Found: C, 38.6; H, 5.17; N, 45.3.

EXAMPLE 17

*2-Amino-6-Hydroxy-4-Methyl-s-Triazine 1-Oxide*

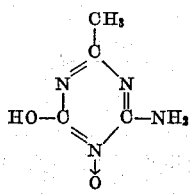

The mother liquor from the reaction described under Example 2, after standing for several days, deposited a quantity of crystals, which after treatment with aqueous sodium hydroxide and recrystallization from hot water gave a product melting at about 221–222° C. This material gave a light orange color with ferric chloride solution.

*Analysis.*—Calculated for $C_4H_6N_4O_2$: C, 33.8; H, 4.24; N, 39.4; O, 22.4. Found: C, 33.9; H, 4.35; N, 39.4; O, 22.7.

EXAMPLE 18

*2-Amino-4-n-Heptadecyl-6-Hydroxy-s-Triazine 1-Oxide*

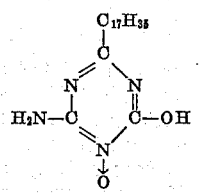

In a reaction similar to that of Example 10 wherein 2,4-diamino-6-n-heptadecyl-s-triazine was reacted with peracetic acid in glacial acetic acid, temperature was allowed to reach 80° C. The product, after crystallization from acetic acid, melted at about 145–147° C.

*Analysis.*—Calculated for $C_{20}H_{38}N_4O_2$: C, 65.3; H, 10.4; N, 15.28; O, 8.72. Found: C, 65.4; H, 10.4; N, 15.36; O, 8.63.

EXAMPLE 19

*2,6-Diamino-4-(Hexadecafluoro-Omega-Hydro-n-Octyl)-s-Triazine 1-Oxide*

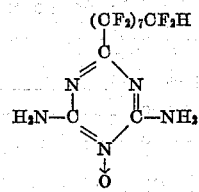

The procedure of Example 8 is followed substituting an equivalent amount of 2,4-diamino-6-(hexadecafluoro-omega-hydro-n-octyl)-s-triazine for the 2,4-diamino-6-(pentadecafluoro-n-heptyl)-s-triazine thereby yielding the product.

The omega-hydrogen polyfluoro guanamines are prepared by the method used to prepare 2,4-diamino-6-(pentadecafluoro n-heptyl)-s-triazine referred to in Example 8, by substituting equivalent quantities of methyl hexadecafluoro-omega-hydro-n-nonanoate for methyl pentadecafluoro-n-octanoate.

EXAMPLE 20

A mixture of 10 parts of the product of Example 2, 53 parts of 30% aqueous formaldehyde, 350 parts of water and sufficient potassium carbonate to adjust the pH to 8–9 was heated on a steam bath for 15 minutes. After a filtration, the solution was evaporated in vacuo until a thick syrup was obtained.

A pad bath was prepared containing 5% solids of the above resin and 1% of magnesium chloride based on the weight of the resin solids in the pad bath. The resin solution was applied to 80 x 80 cotton percale by a standard padding procedure using a 100% wet pick-up. The treated fabric was dried at 225° F. for 2 minutes and then heated at 350° F. for 1.5 minutes.

The treated fabric, containing 5% of the resin solids on the weight of the fabric, and the untreated fabric were tested for wrinkle recovery before and after 5 wash cycles in an automatic washing machine using soap and a water-temperature of 140° F.

The wrinkle recovery of the fabric was measured on a wrinkle recovery tester following the tentative method 66–1959 described on page 171 of the 1959 Technical Manual and Yearbook of the American Association of Textile Chemists and Colourists, vol. 35.

|  | Wrinkle Recovery [1] | |
|---|---|---|
|  | Initial, deg. | After 5 washes, deg. |
| Untreated cloth | 158 | 157 |
| Treated cloth | 230 | 227 |

[1] Total in degrees for warp plus filling.

EXAMPLE 21

Pieces of 80 x 80 cotton percale were immersed in 5% isopropanol solutions of the product of Example 8 and the starting material used in the preparation of Example 8, namely, 2,4-diamino-6-(pentadecafluoro-n-heptyl)-s-triazine. The excess liquid was squeezed from the fabrics and the fabrics were dried at room temperature for 24 hours. The two treated fabrics were then tested for water and oil repellency by placing a few drops of water and mineral oil on the treated fabrics. The time required for wetting and penetration of the fabrics with the two liquids was noted. In the case of 2,4-diamino-6-(pentadecafluoro-n-heptyl)-s-triazine the fabric was wetted immediately with water and the mineral oil penetrated the fabric after about 3 hours. In the case of the fabric treated with the product of Example 8, there was only a slow penetration of the fabric by water and no penetration of the fabric with mineral oil after 9 days.

EXAMPLE 22

The product of Example 8, methylolated by reacting with formaldehyde according to the procedure of Example 21, but substituting an equivalent amount of the product of Example 8 for the product of Example 2, when applied to cotton by the procedure of Example 21, imparts wrinkle resistance and grease repellency to the cotton.

EXAMPLE 23

*Formation of an Iron Chelate of the Product of Example 8*

A solution of 1.0 part (0.00202 mole) of the product of Example 8 in 8 parts of methanol was treated with 0.981 part (0.00606 mole) of anhydrous ferric chloride. After the iron chloride had completely dissolved, 70 parts of ether was added. Excess ferric chloride was removed by extracting the red ether solution with three 50 part portions of cold water. After filtration, the ether solution was evaporated to dryness. The orange-red residue, amounting to 0.9 part, melted at 250–253° C. The following analytical results indicate that three triazine nuclei were combined with each atom of iron.

Calculated for $C_{30}H_{12}F_{45}N_{16}O_3Fe$: N, 13.6; Fe, 3.82. Found: N, 14.1; Fe, 3,67.

EXAMPLE 24

The procedure of Example 24 was repeated substituting an equivalent amount of the product of Example 10 for the product of Example 8. The red product melted at about 193–196° C. The following analytical results indicate that the chelate contained two triazine nuclei per atom of iron.

Calculated for $C_{40}H_{78}N_{10}O_2Cl_2Fe$: Fe, 6.52. Found: Fe, 6.87.

I claim:

1. A compound of the formula:

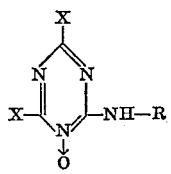

wherein one X is a member selected from the group consisting of hydrogen, alkyl, oxyalkyl, haloalkyl, aryl, nitroaryl, haloaryl, hydroxyaryl, aralkyl, pyridyl, furyl, hydroxy, alkoxy, aryloxy, $(CH_2)_n$—A and

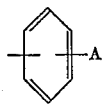

the other X is a member selected from the group consisting of hydrogen, aralkyl, alkyl, aryl and

R, $R_1$ and $R_2$ are individually selected from the group consisting of hydrogen, alkyl, aralkyl, aryl, nitroaryl, haloaryl and hydroxyaryl; n is a positive integer less than nineteen; A is the radical:

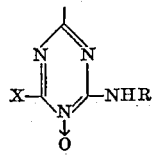

wherein R and X are as hereinbefore defined and both correspond identically with the R and X substituents on the other triazinyl nucleus; provided that aforementioned alkyl moieties contain no more than 18 carbons and aryl moieties are mononuclear carbocycles.

2. 2,6-diamino-s-triazine 1-oxide.
3. 2,6-diamino-4-methyl-s-triazine 1-oxide.
4. 2,6 - diamino - 4 - (hexadecafluoro - omega - hydro-n-octyl)-s-triazine 1-oxide.
5. 2,6 - diamino - 4 - (pentadecafluoro - n - heptyl)-s-triazine 1-oxide.
6. 2,6-diamino-4-isopropyl-s-triazine 1-oxide.
7. 2,6-diamino-4-n-undecyl-s-triazine 1-oxide.
8. The process of preparing a compound of the formula:

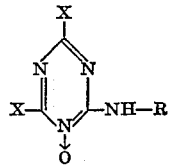

wherein one X is a member selected from the group consisting of hydrogen, alkyl, oxyalkyl, haloalkyl, aryl, nitroaryl, haloaryl, hydroxyaryl, aralkyl, pyridyl, furyl, hydroxy, alkoxy, aryloxy, $(CH_2)_n$—A and

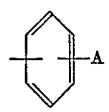

the other X is a member selected from the group consisting of hydrogen, aralkyl, alkyl, aryl and

R, $R_1$ and $R_2$ are individually selected from the group consisting of hydrogen, alkyl, aralkyl, aryl, nitroaryl, haloaryl and hydroxyaryl; n is a positive integer less than nineteen; A is the radical:

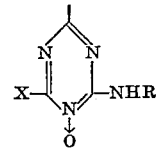

wherein R and X are as hereinbefore defined and both correspond identically with the R and X substituents on the other triazinyl nucleus; provided that aforementioned alkyl moieties contain no more than 18 carbons and aryl moieties are mononuclear carbocycles; which comprises treating a solution of the corresponding non-oxide derivative in a polar organic solvent with an organic peracid selected from the group consisting of peracetic, perphthalic, perbenzoic and trifluoroperacetic acids, said treatment being conducted at a temperature between about 30° and 50° C. until the reaction is substantially completed, and recovering the mono-N-oxide thus formed.

9. The process of claim 8 wherein the organic peracid is peracetic acid and the polar organic solvent is glacial acetic acid.

References Cited in the file of this patent

UNITED STATES PATENTS

| | | |
|---|---|---|
| 2,729,640 | Kaiser et al. | Jan. 3, 1956 |
| 2,780,622 | Schroeder | Feb. 5, 1957 |

OTHER REFERENCES

Degering: An Outline of Organic Nitrogen Compounds, University Lithoprinters, Ypsilanti, Michigan, 1950, page 215.

Grundmann et al: Chemische Berichte, vol. 87, No. 5, pages 747–754 (1954).

Shaw et al.: Journal of Organic Chemistry, vol. 24, 1959, pages 1809–1811 (1959).

Smolin et al.: "s-Triazines and Derivatives," Interscience Publishers Inc., 1959, pages 239, 244.

Smolin et al.: "s-Triazines and Derivatives," published by Interscience Publishers Inc., 1959, pages 315, 351, 355 and 356.